June 13, 1950
F. R. FOWLER
2,510,968
GYROSCOPE
Filed Dec. 28, 1945
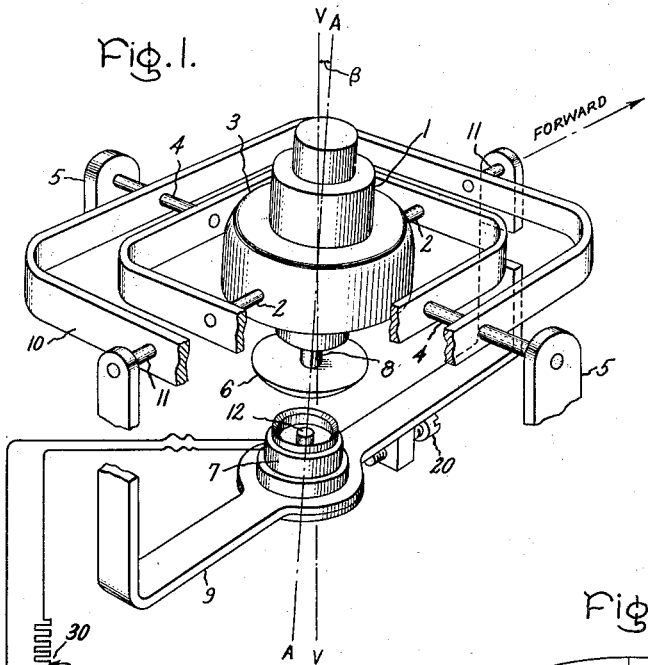
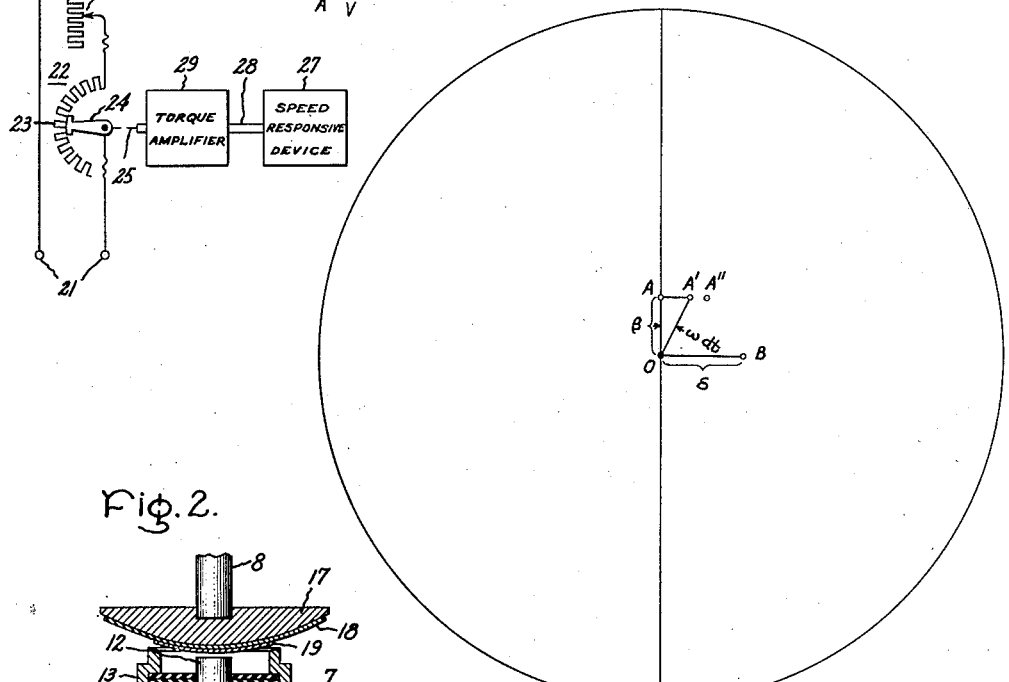
Inventor:
Francis R. Fowler,
by Claude A. Mott
His Attorney.

Patented June 13, 1950

2,510,968

UNITED STATES PATENT OFFICE 2,510,968

GYROSCOPE

Francis R. Fowler, Schenectady, N. Y., assignor to General Electric Company, a corporation of New York Application December 28, 1945, Serial No. 637,657

5 Claims. (Cl. 74—5.46)

The present invention relates to gyroscopes, and more particularly to an improved erection system for gyro verticals adapted to be mounted on ships, aircraft, and other moving vehicles.

Gyroscopes of the vertical spin axis type which are commonly referred to as gyro verticals, are widely used to provide a reference of the vertical direction or horizontal plane for indication or control purposes, or both. Because spin axis of a gyroscope tends to wander slowly due to bearing friction, rotation of the earth, etc., it is necessary to provide an erection system for maintaining the spin axis of the gyroscope in the reference position. The erection system usually comprises a pendulum positioned by gravity and means controlled by the position of the pendulum relative to the gyro for slowly precessing the gyro into the reference position indicated by the pendulum. Due to the long period of the gyro, short period oscillations of the pendulum due to rapid accelerations do not cause appreciable error since the mean position of the pendulum indicates the true vertical. However, a sustained departure of the pendulum from the true vertical due to centrifugal acceleration, as occurs when the gyro vertical is mounted on a moving vehicle which turns, causes an appreciable displacement of the gyro spin axis from the reference position, giving rise to an error known as "turn error."

Heretofore partial compensation for turn error has been accomplished by the expedient of balancing the erecting pendulum in such a way that in the normal erected position the gyro spin axis tilts somewhat from the vertical in the direction of motion of the vehicle. Under certain conditions of vehicle speed and angular rate of turn, where the precession torque applied to the gyro due to the outward swing of the pendulum causes the gyro to precess about the true vertical axis at a rate equal to the rate of turn of the vehicle, complete turn error compensation is obtained due to the fact that a predetermined orientation of the gyro spin axis relative to the vehicle is maintained. However, the difficulty encountered is the fact that outward swing of the pendulum during turns varies not only with the rate of turn of the vehicle, but also with the speed. In order to increase the range of operating conditions where complete turn error compensation is obtained, it has been proposed heretofore to provide an erection system in which the precessing torque applied to the gyro is substantially independent of the extent of outward swing of the pendulum so that complete turn error compensation is obtained for all speeds at one predetermined rate of turn. Such an arrangement is disclosed for example in a copending application of Richard G. Jewell, Serial No. 468,859, filed December 12, 1942, now Patent No. 2,418,032, which is assigned to the same assignee as the present invention. This system, however, does not provide complete turn error compensation for rates of turn other than that for which the erection system is adjusted.

An object of the present invention is to provide an improved erection system for a gyro vertical.

Further object of the invention is to provide an erection system for a gyro vertical adapted for use on a moving vehicle which automatically gives complete turn error compensation for various rates of turn and vehicle speeds.

Further objects and advantages of my invention will become apparent as the following description proceeds and the features of novelty which characterize the invention will be pointed out with particularly in the claims annexed to and forming a part of this specification.

Briefly, according to the present invention, the erecting pendulum of the gyro vertical is arranged so that the gyro spin axis is somewhat tilted in the direction of vehicle motion. In order to cause the gyro to precess about the true vertical axis at the same angular rate as the rate of turn of the vehicle on which the gyro is mounted to obtain turn error compensation, the erection system is designed so that a precessing torque is exerted on the gyro which is proportional to the tangent of the relative displacement of the gyro and pendulum. Also in order to compensate for variations in the amount of pendulum swing with vehicle speed during turns, an arrangement is provided for varying automatically the proportionality factor relating the pendulum displacement and the gyro precession rate. In this manner complete turn error compensation is obtained for various speeds and rates of turn of the vehicle on which the gyro vertical is mounted.

My invention will be better understood by reference to the following detailed description taken in connection with the accompanying drawing in which:

Fig. 1 shows a gyro vertical provided with an erection system arranged in accordance with the present invention.

Fig. 2 is a cross-sectional view showing certain constructional details of the eddy current erection system;

And Fig. 3 is an explanatory diagram useful in explaining the operation of the invention.

Referring to Fig. 1 of the drawing I have shown a gyro vertical which is suitable for mounting on a moving vehicle, such as a ship or an aircraft. As used on ships such a gyroscope may be connected through suitable torque amplifiers to stabilize fire control equipment. On aircraft the gyroscope may be used to indicate the pitch and bank attitudes of the aircraft and also, if desired, to control the pitch and bank channels of an automatic pilot.

As shown, the gyroscope comprises a rotor bearing frame 1 which houses a gyroscope rotor (not shown) having a spin axis extending in the direction of the dash line AA. The gyro bearing frame is pivoted for movement about a horizontal axis by means of trunnions 2 which are pivotally mounted in a horizontal gimbal 3. The gimbal 3 is in turn pivoted for movement about a horizontal axis perpendicular to the axis of the trunnions 2 by means of trunnions 4 which are pivotally mounted in fixed supports 5. The supports 5 are arranged on the moving vehicle in such a way that the axis of the trunnions 4 extends athwartship and the axis of trunnions 2 extends in a direction fore and aft the axis.

In order to provide means for erecting the gyroscope so that the spin axis AA is kept in a predetermined reference position, there is provided an eddy current erection system comprising a rotating eddy current disk 6 and a cooperating electromagnet 7. The eddy current disk 6 is mounted on a rotating shaft 8 which may be, as shown, an extension of the gyro rotor shaft.

Electromagnet 7, which cooperates with the eddy current disk 6, is pendulously mounted beneath the disk so that it is free to swing in any direction under the influence of gravity and acceleration forces acting thereon. To this end the electromagnet is centrally mounted on a support or bail 9 which is pivotally mounted on a horizontal outer gimbal 10 by means of trunnions 11. The gimbal 10 is in turn pivotally supported on the trunnions 4. The axes of trunnions 4 and 11 are perpendicular so that universal movement of the electromagnet 7 is permitted.

As is best shown in Fig. 2 of the drawing, the electromagnet 7 comprises a center cylindrical pole piece 12 and an outer annular pole piece 13 which are mounted in concentric relationship on a base member 14 which is preferably formed of magnetic material so as to provide a return path for magnetic flux flowing between the poles 12 and 13. The electromagnet extends through a central opening in the bail 9, the base member 14 having a retaining flange 15 which is secured to the bail by means of screws not shown.

The electromagnet is provided with an energizing coil 16 which surrounds the center pole piece 12 and lies in the space between the inner pole piece 12 and the outer annular pole piece 13. When the coil 16 is energized, a magnetic field flows between the pole pieces 12 and 13 which passes through the eddy current disk 6 and is substantially symmetrical about the axis of the pole piece 12.

The eddy current disk 6 comprises a member 17 mounted on the end of shaft 8 which is arranged to lie in close proximity to the pole pieces of electromagnet 7 and is preferably formed of magnetic material so as to provide a low reluctance path for the magnetic flux flowing between the poles of electromagnet 7. On the lower surface of the member 17 which is approximately spherical in contour, there is mounted a thin sheet of electrically conducting material 18, such as copper or aluminum. When the gyroscope is in operation, the eddy current disk 6 rotates and the magnetic flux produced by the electromagnet 7 causes eddy currents to be induced in the conducting member 18, as will be well understood by those skilled in the art. When the eddy current disk 6 and electromagnet 7 are in a neutral position shown in Fig. 2 in which the axes of the shaft 8 and the pole piece 12 are in alignment, the eddy currents produced in the eddy current disk 6 are in a state of balance about the axis of shaft 8 and there is no drag torque tending to precess the gyroscope. If, however, relative displacement occurs between the eddy current disk 6 and electromagnet 7, the induced eddy currents are asymmetrical with reference to the axis of shaft 8, and as a result there is a net eddy current drag torque which precesses the gyroscope in a direction to restore the eddy current disk 6 to the neutral position. Thus, due to the eddy current erecting action, the gyroscope is continuously precessed toward a position determined by the position of the pendulous electromagnet 7.

For reasons which will become clear as the description proceeds, it is desirable to have the precessing torque exerted on the gyroscope vary approximately as the tangent of the relative angular displacement of the gyro and the pendulous electromagnet 7. As will be understood by those skilled in the art, this can be accomplished in a number of ways. One way to accomplish this is to select the curvature of the lower surface of the eddy current disk 6 such that the air gap between the magnet and the eddy current member varies upon relative movement to give the desired torque characteristics. For example, if it is found that the torque increases too rapidly upon displacement of the electromagnet from the neutral position, this condition can be remedied by selecting the curvature of the eddy current member such that the air gap increases with the displacement of the magnet, and vice versa. As a further aid in obtaining this desired characteristic, the thickness of the conducting member may be varied with radial distance from the center of the shaft 8. For this purpose there is shown in Fig. 2 a thin conducting member 19 which is symmetrically superimposed upon a central portion of the conducting member 18 to give a greater effective thickness of the eddy current conducting portion at or near the neutral position. With this arrangement, when the pendulous electromagnet moves away from the neutral position, the eddy current torque tends to drop off due to the decreased thickness of the rotating portion in which the eddy currents are induced. It will be obvious that by suitably varying the air gap and the thickness of the eddy current conducting portion with displacement of the pendulous electromagnet from the neutral position, any desired shape of the torque versus the displacement curve can be obtained.

According to the present invention, turn error compensation for all speeds and rates of turn of the vehicle is obtained by adjusting the erection system so that the spin axis of the gyro is normally tipped from the vertical in the direction of movement of the vehicle and by providing means for varying the erection characteristic in accordance with the speed of the vehicle as will now be described.

Tipping of the gyro spin axis in the direction of movement of the vehicle is accomplished by adjusting the balance of the pendulous electromagnet 7. In the illustrated arrangement this is accomplished by the provision of an adjustable off-center weight 20 which is mounted on the ball 9 in such a manner that the center pole 12 of the electromagnet 7 has a position of rest slightly to the rear of the true vertical line VV passing through the center of suspension of the pendulous magnet. With this arrangement, when the vehicle is stationary or is moving uniformly in a straight line, the gyroscope is erected to the position shown in Fig. 1 in which the gyro spin axis AA is tipped somewhat from the true vertical VV by an amount equal to the angle $\beta$, the orientation of the spin axis being such that a plane containing the vertical line VV and the spin axis AA lies in the direction of motion of the vehicle on which the gyroscope is mounted. The direction of the spin axis tip is such that the top of the gyroscope leans in the forward direction indicated by the arrow.

With the gyro spin axis normally tipped as shown, complete turn error compensation for all the speeds and rates of turn of the vehicle can be obtained, provided the erection system exerts a torque on the gyroscope during a turn which causes the gyroscope to precess about the vertical VV at a rate which is just equal to the rate of turn of the vehicle. With such an arrangement it will be apparent that the orientation of the spin axis of the gyro does not change relative to the vehicle during the turn so that there will be no turn error or, as stated in another way, turn error compensation will be complete. This action can most easily be seen by reference to the following mathematical considerations taken in connection with the explanatory diagram shown in Fig. 3 of the drawing.

When the vehicle makes a turn, it is subjected to a centrifugal acceleration, $\omega v$, where $\omega$ is the rate of turn of the vehicle and $v$ is the linear velocity. This acceleration causes the apparent vertical to be displaced toward the outside of the turn by an angle $$1 \qquad \delta = \tan^{-1} \frac{\omega v}{g}$$

where $g$ is the acceleration of gravity.

As a result of this displacement, the erection system causes the gyroscope to precess in a direction perpendicular to the direction of motion of the vehicle at a rate $\phi$, which is a function of the angle $\delta$.

The geometrical figure shown in Fig. 3 of the drawing represents the top surface of a unit sphere with its center at the center of the gimbal system of the gyroscope. O is the projection of the true vertical, and A is the projection of the gyroscope spin axis on the surface of the sphere. OA, which is the projection of the angle $\beta$, is also the direction of motion of the vehicle and OB is the projection of the apparent vertical.

If the vehicle is turning at a rate $\omega$, OA' is the direction of motion of the vehicle at an increment of time, $dt$, later, when it has turned through an angle $\omega dt$. In the same increment of time the gyroscope has precessed through the angle $$2 \qquad AA'' = \phi dt$$

because of the action of the erection system. The angle AA' equals $\beta \omega dt$, provided that $\beta$ and $dt$ are small. Therefore, if $\phi = \beta \omega$, $AA'' = AA'$, and the gyroscope will still indicate the true vertical after the vehicle has been turning for a time $dt$. Since the same analysis can be made for any particular increment of time during the turn, there will be no error in the gyroscope indication no matter how long the vehicle continues to turn, provided that the condition $\phi = \beta \omega$ is satisfied.

As pointed out above, the erection system is designed to cause a precession rate which is proportional to the tangent of the displacement angle between the gyroscope and the erecting pendulum. Therefore:

$$3. \qquad \phi = K \tan \delta = \frac{K \omega v}{g}$$

where K is the proportionality factor. Therefore, by adjusting K so that $$4 \qquad K = \frac{\beta g}{v}$$

the condition that $\phi = \beta \omega$ is satisfied and there will be no turning error regardless of the rate of turn or the vehicle speed.

It will be apparent from an inspection of Equation 4 that in order to satisfy the requirement for turn error compensation the proportionality factor K must be varied inversely to the vehicle velocity $v$. In the illustrated embodiment of the invention, this is accomplished by varying the exciting current of the electromagnet 7, and consequently the magnetic flux and eddy current drag torque produced thereby, inversely as the speed of the vehicle. To this end, the energizing coil 16 of the electromagnet is connected to a suitable source of direct or alternating current supply 21 through a series connected rheostat 22 comprising a resistance element 23 and a rotatable wiper arm 24. The wiper arm 24 is mounted on a rotatable shaft 25 which is positioned in accordance with the output of a suitable device responsive to the speed of the vehicle. Such a speed-responsive device is illustrated schematically by the numeral 27, the device having an output shaft 28 which is angularly displaced in accordance with the speed of the vehicle. In order to obtain a high degree of accuracy and to avoid undue loading of the speed-responsive device 27, the rheostat arm 25 and the output shaft 28 of the speed-responsive device are coupled through a torque amplifier 29. The details of the speed-responsive device 27 and the torque amplifier 29 are not shown since these devices are well known and form no part of the present invention. The coupling between the speed-responsive device 27 and the rheostat arm 24 is such that when the speed of the vehicle increases, the rheostat arm 24 is rotated in a counterclockwise direction to increase the resistance and reduce the exciting current of the electromagnet 7. When the speed of the vehicle decreases, the arm 24 rotates in a clockwise direction to decrease the resistance and increase the exciting current of the electromagnet 7. By properly tapering the resistance element 23 of the rheostat 22 in connection with the angular output of the speed-responsive device 27, it will be clear that the exciting current of the electromagnet 7, and consequently the related proportionality factor K, can be made to satisfy the relationship specified by Equation 4.

In order to facilitate initial adjustment of the erection characteristic, there is provided a trimming rheostat 30 which is also serially connected in the excitation circuit of the electromagnet 7. By adjusting rheostat 30 the electromagnet excitation can be initially adjusted for zero turn error, subsequent adjustments for speed variations being accomplished automatically by the speed controlled rheostat 22.

It will be clear from the foregoing that I have provided an erection system for a gyro vertical which completely compensates for turn error for various conditions of vehicle speed and rates of turn, the compensation being accomplished automatically so that there is no need for manual adjustment. Therefore, design compromises previously necessitated because of turn error considerations are eliminated by my improved erection system whereby a more accurate indication of the vertical on moving vehicles during turns is obtained than has been possible heretofore.

It should be clearly understood that my invention, in its broader aspects, is not limited to the illustrated arrangement in which an eddy current erection system is used. Thus, for example, the principle of my invention may be applied to an erection system in which electric torque motors are used to precess the gyroscope, the torque motors being controlled by a gravity-responsive electrolytic switch. In such a case, the electrolytic switch would constitute a liquid pendulum as distinguished from a solid pendulum used in the illustrated arrangement. In both cases the pendulum is simply a means for measuring the direction of the apparent vertical, i. e. the resultant of the gravity and centrifugal acceleration forces, and is used to control the gyroscope precessing torque in such a manner that the torque varies as a function of relative displacement between the direction of the apparent vertical and the gyroscope spin axis.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, a universally pivoted gyro adapted to be mounted on a moving vehicle, said gyro having a spin axis that is normally tipped from the vertical a small amount in the direction of motion of said vehicle, an erection device comprising a first member mounted on said gyro and a second member mounted on a universal pendulum to swing relative to said first member, means controlled by the position of said pendulum for precessing said gyro toward the apparent vertical position indicated by said pendulum during turns at a rate variable in accordance with relative displacement between the gyro and pendulum and additional means for varying the gyro precession rate inversely as the speed of movement of said vehicle when said second member is displaced from a neutral position whereby to maintain a predetermined orientation of the gyro spin axis relative to the direction of movement of vehicle during turns at various speeds and rates of turn.

2. In combination, a universally pivoted gyroscope adapted to be mounted on a moving vehicle, said gyroscope having a spin axis that is normally tipped from the vertical a small amount in the direction of motion of said vehicle, an erection system comprising a first member mounted on said gyroscope and a second member mounted as a universal pendulum to swing relative to said first member, one of said members comprising an eddy current conductor and the other comprising an electromagnet, means for energizing said electromagnet to produce a magnetic flux in said eddy current conductor, means for producing relative rotation of said members whereby eddy current drag torque is applied to said gyroscope to cause precession thereof at a rate variable in accordance with relative displacement of said members from a neutral position, and means for varying the exciting current of said electromagnet inversely as the speed of said vehicle whereby to provide turn error compensation during turns of said vehicle at various speeds and rates of turn.

3. An erection system for a gyro vertical adapted to be mounted on a moving vehicle comprising an eddy current conductor member, a magnet member, one of said members being mounted on said gyro and the other of said members being mounted on a pendulum, means for relatively rotating said members whereby eddy current drag torques are produced tending to precess said gyro to a position indicated by said pendulum, said members being arranged so that said gyro is erected to a normal position in which the spin axis tips from the vertical in the direction of movement of said vehicle and means responsive to the speed of said vehicle for varying the flux produced by said magnet inversely as the speed of said vehicle whereby to vary the gyro precession rate in a manner to provide turn error compensation at various speeds and rates of turn of said vehicle.

4. In combination, a universally pivoted gyroscope adapted to be mounted on a moving vehicle, said gyroscope having a spin axis that is normally tipped from the vertical a small amount in the direction of motion of said vehicle, an erection system comprising a first member mounted on said gyroscope and a second member mounted as a universal pendulum to swing relative to said first member, one of said members comprising an eddy current conductor and the other comprising an electromagnet, means for energizing said electromagnet to produce a magnetic flux in said eddy current conductor, means for producing relative rotation of said members whereby eddy current drag is applied to said gyroscope to cause precession thereof at a rate variable in accordance with relative displacement of said members from a neutral position, and compensating means acting independently of the position of said pendulum for varying the effective magnetic flux threading said eddy current conductor inversely as the speed of said vehicle whereby to provide turn error compensation during turns of said vehicle at various speeds and rates of turn.

5. In combination, a universally pivoted gyroscope adapted to be mounted on a moving vehicle, said gyroscope having a spin axis that is normally tipped from the vertical a small amount in the direction of motion of said vehicle, an erection system comprising a first member mounted on said gyroscope and a second member mounted as a universal pendulum to swing relative to said first member, one of said members comprising an eddy current conductor and the other comprising an electromagnet, means for energizing said electromagnet to produce a magnetic flux in said eddy current conductor, means for producing relative rotation of said members whereby eddy current drag is applied to said gyroscope to cause precession thereof at a rate variable in accordance with relative displacement of said members from a neutral position, and compensating means comprising a rheostat connected in the excitation circuit of said electromagnet and actuated in accordance with the speed of said vehicle for varying the magnetic flux threading said eddy current conductor inversely as the speed of said vehicle whereby to provide turn error compensation during turns of said vehicle at various speeds and rates of turn.

FRANCIS R. FOWLER.

REFERENCES CITED

The following references are of record in the file of this patent:

UNITED STATES PATENTS

| Number | Name | Date |
|---|---|---|
| 2,229,645 | Esval et al. | Jan. 28, 1941 |
| 2,339,606 | Sias | Jan. 18, 1944 |
| 2,409,659 | Braddon | Oct. 22, 1946 |
| 2,418,032 | Jewell | Mar. 25, 1947 |
| 2,446,180 | Haskins | Aug. 3, 1948 |

FOREIGN PATENTS

| Number | Country | Date |
|---|---|---|
| 492,670 | Great Britain | Sept. 23, 1938 |